Patented June 19, 1945

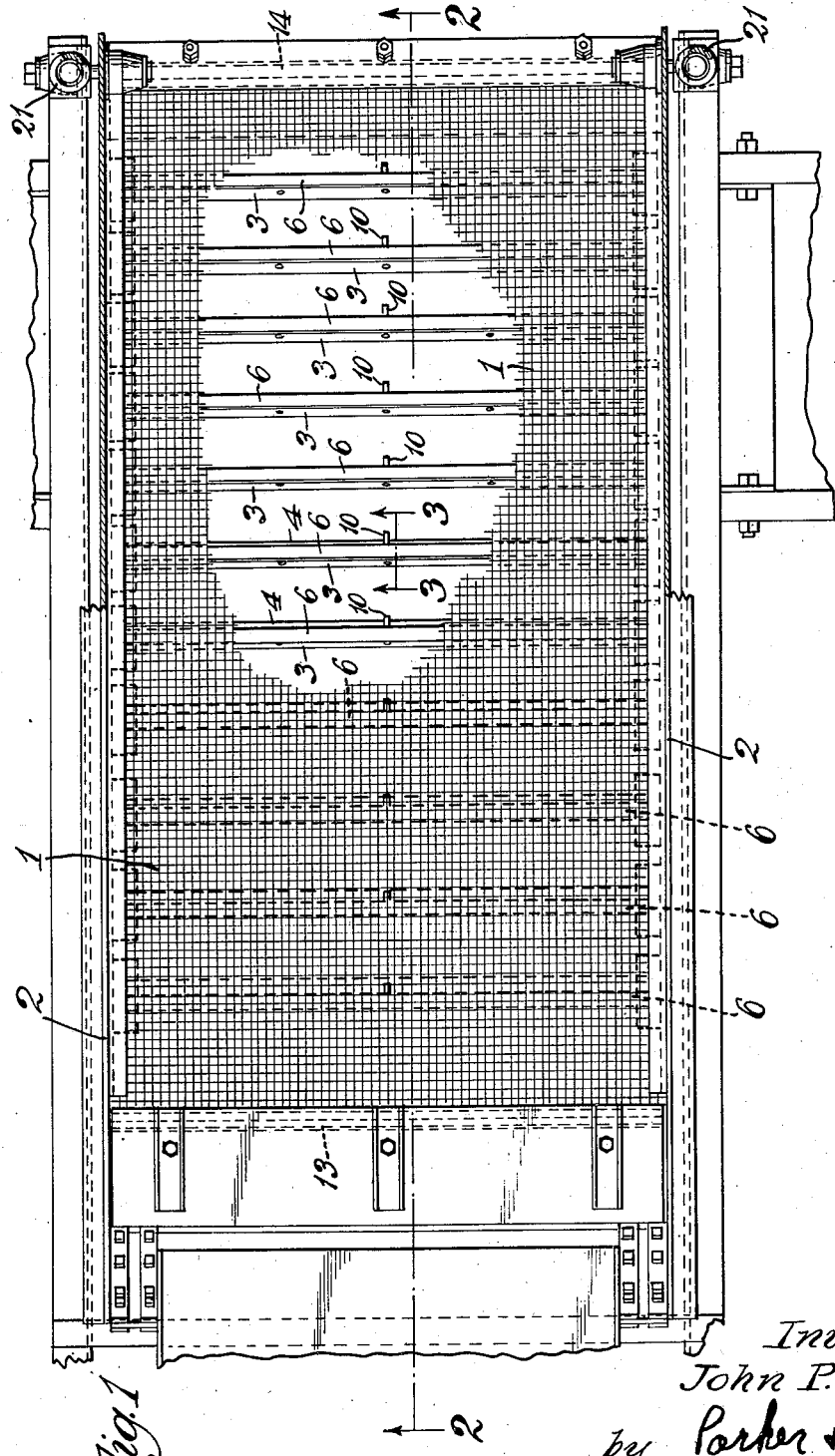

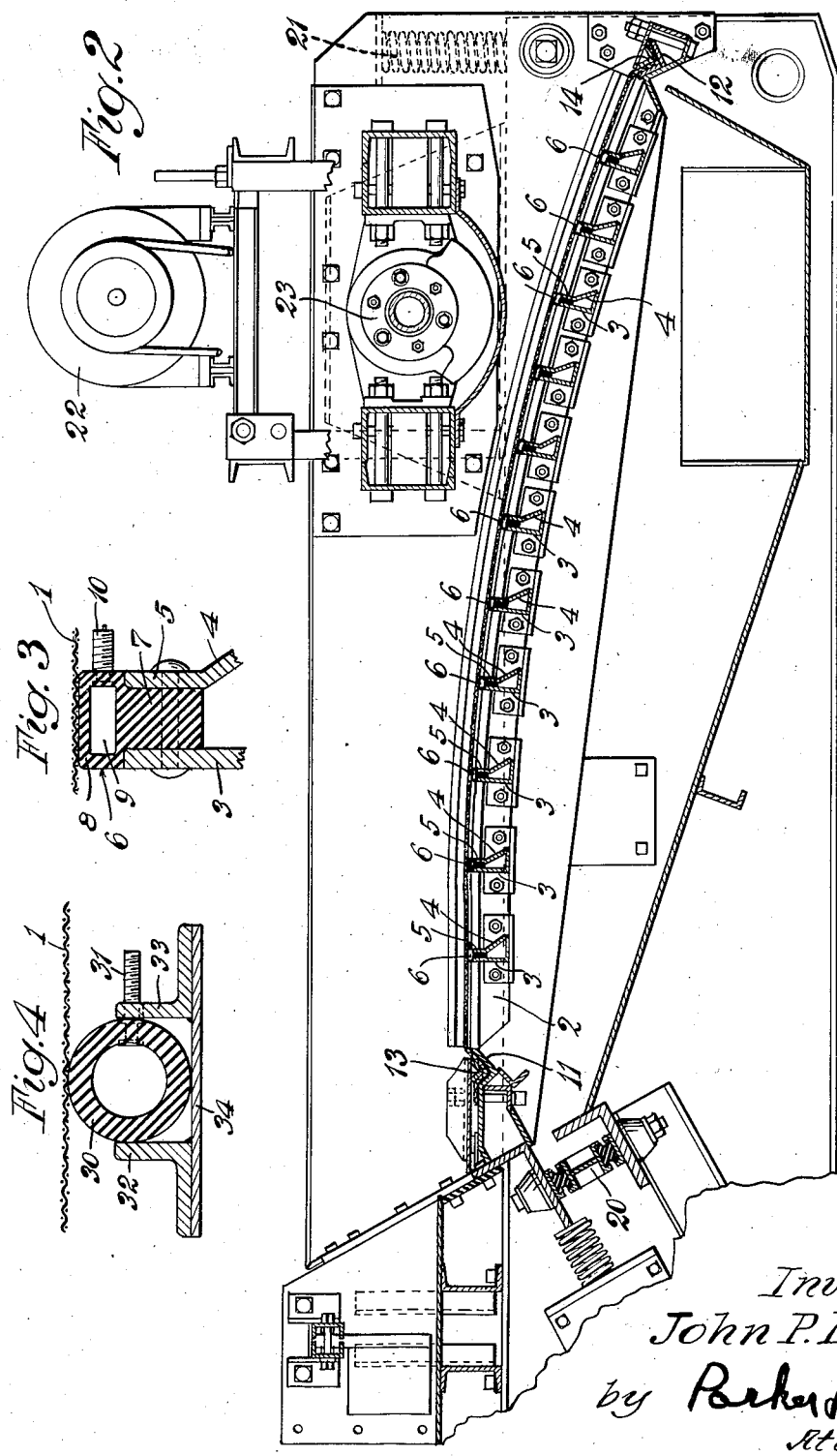

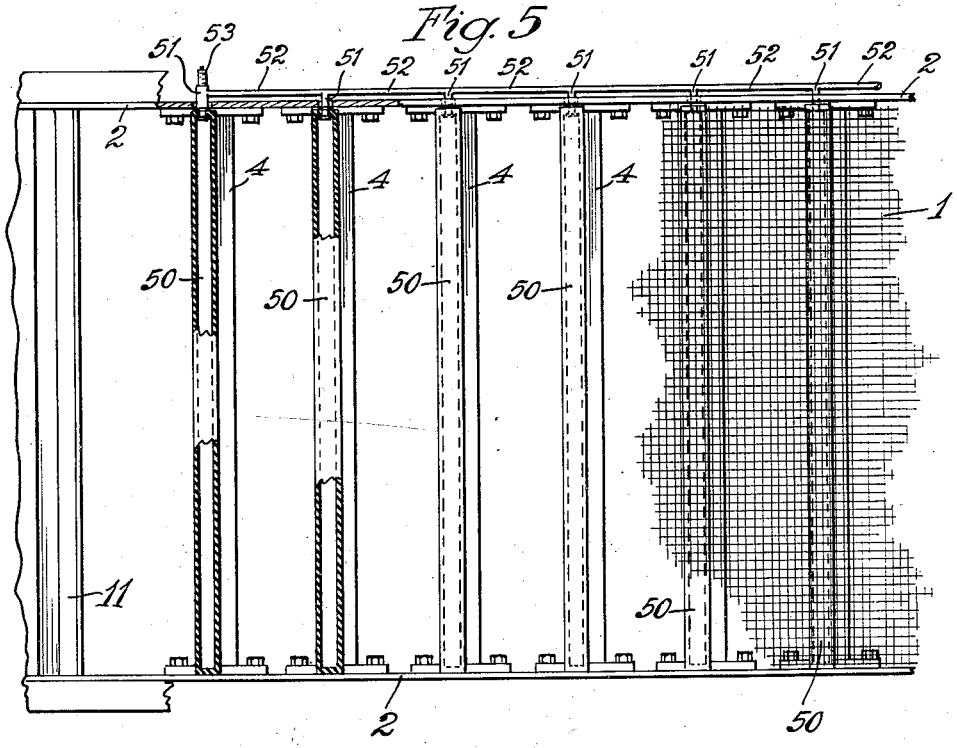
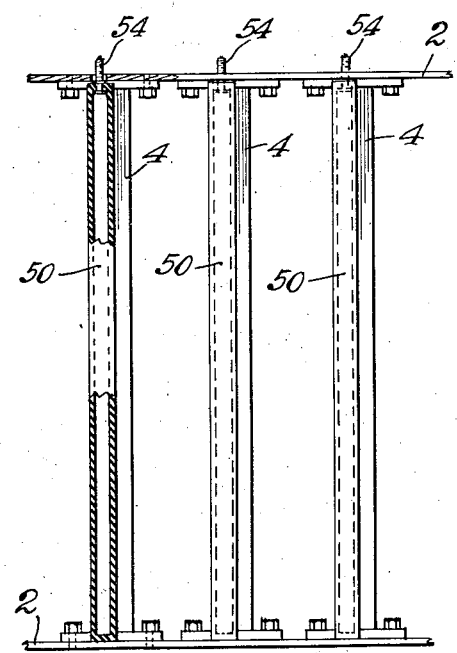

2,378,463

UNITED STATES PATENT OFFICE 2,378,463

FLEXIBLE SCREEN SUPPORT

John P. Burls, London W. 1, England, assignor to Nordberg Manufacturing Company, Milwaukee, Wis., a corporation of Wisconsin Application April 5, 1943, Serial No. 481,859

3 Claims. (Cl. 209—402)

The invention relates to an improvement in screening apparatus and has for one purpose the provision of improved means for supporting the mesh or separating member of a screen.

Another purpose is the provision of an improved screen and screen support in which an inflated member is employed to support the mesh or separating element.

Another purpose is the provision of such a support in which an inflated member of flexible material is employed, with means for controlling, and, if necessary, varying the inflation.

Other purposes will appear from time to time in the course of the specification and claims.

The invention is illustrated more or less diagrammatically in the accompanying drawings, wherein:

Figure 1 is a plan view of the screen embodying the invention, with parts broken away and parts in section;

Figure 2 is a section along the line 2—2 of Figure 1;

Figure 3 is a section on an enlarged scale on the line 3—3 of Figure 1;

Figure 4 is a section similar to Figure 3, illustrating a variant form of the invention;

Figure 5 is a partial plan view, with parts in section, of a screen frame illustrating a variant application of the invention; and Figure 6 is a similar view of a still further application of the invention.

Like parts are indicated by like characters throughout the specification and drawings.

Referring to the drawings, 1 generally indicates a screen mesh or fabric, which is to be supported. It will be understood that this mesh may be supported upon a wide variety of screen decks and screens, and the details thereof do not of themselves form part of the present invention. For convenience and to give a practical application of the invention, there is illustrated a screen deck including side frame elements 2, and a plurality of transversely extending members, each of which is shown as including an angle 3 and an adjacent piece 4, the upper end of which, as at 5, is parallel with the upper portion of the vertical or generally vertical flange of the angle. Located between each of the members 3 and 5 is a transversely extending member generally indicated as 6, which may be of rubber or the like. It includes a portion 7 extending between the members 3 and 5 and an upper portion 8 having a hollow 9. It will be understood that, when the hollow 9 is inflated with any suitable gas or liquid, the parts may be in the position in which they are shown in Figure 3, with a portion of the member 8 extending out above the upper edges of the members 3 and 5, the upper walls of the member 8 providing a somewhat yielding support for the screen cloth or mesh 1.

I employ any suitable means for inflating and deflating the space 9. I illustrate for example any suitable valve element 10, the details of which do not of themselves form part of the present invention. I may for example use an ordinary valve of the Schraeder type, a one-way valve, which readily admits liquid or gas under pressure, but which is normally sealed shut by pressure within the space 9, provided by the distension and the corresponding compressive effect of the relatively thin flexible upper and side walls of the member 8. The ends of the elements above described may be closed in any suitable fashion so that the only access to the interior space 9 is through the valve 10.

I may provide any suitable means for tensioning the mesh 1. In the particular form of screen deck herein shown the ends of the mesh are dropped into the upward concavities of the transversely extending angle members 11, 12, located at and extending across the opposite ends of the deck. In order to tension the deck I provide transversely extending angle members 13, 14, which may be drawn downward into a locking relationship with the angles 11 and 12. The result is an endwise tensioning of the mesh 1 over the transversely extending pneumatic supports. The supports are preferably arranged as shown in Figure 2, to provide an upward bowing of the mesh, the general surface of the screen being convex.

The deck may be supported in any suitable manner upon any suitable base. I illustrate for example a flexible compression member 20 for the feed end of the screen, and one or more coil springs 21 for the discharge end of the screen. Any suitable vibrating means may be employed, such as the motor 22 and the unbalanced vibrating member 23. However, it will be understood that any suitable means may be employed for supporting and for imparting vibration to the deck.

In the form of Figure 4, in the place of the particular flexible screen support shown in Figure 3, I illustrate a variant form. Referring to Figure 4, the mesh 1 is supported directly upon a flexible tubular supporting member 30, which may be inflated through the valve structure 31 and which, of course, has closed ends. It may be housed between the vertical flanges 32, 33, preferably extending above the center of the member 30. The valve elements 31 may extend through apertures or notches in one of the members 32, 33.

It will be understood that, as to both forms, the flexible element is so proportioned as to be preferably readily removable from the relatively rigid surrounding supporting elements.

Whereas the individual elements have been illustrated as provided with separate valves whereby they may be individually inflated or deflated, it will be understood that, if desired, the entire group may be interconnected to form part of a single system whereby the application of pressure at one point will serve to inflate all of the flexible supports. The intercommunication may, for example, be provided by tubing extending along one or both edges of the deck, preferably at such a level as to be out of contact with the mesh, or the tubing may be located on the exterior of the side frame members 2.

I illustrate in Figure 5 a variation of the invention in which a plurality of the inflatable supports, illustrated as 50, have end passages 51 extending outwardly through the side frame members 2 of the screen deck. These individual connections 51 are illustrated as connected by longitudinally extending passages 52, which may for convenience be located on the outside of the side frame member 2, and serve to associate a plurality of inflatable transversely extending members 50 into a single pneumatic or pressure system.

53 is an admission or discharge passage, which is effective for the entire system, and which may be provided with any suitable valve means not herein shown in detail. It will be understood that the Schraeder valve, if desired, may be employed, or any other suitable means for normally preventing escape of any liquid or gas, such as air, which may be supplied to the system.

It will be understood that the transversely extending passages 52 may be otherwise located, for example just inside of the side frame element 2. The showing may be taken as broadly illustrative or diagrammatic, as the individual members may be connected by any suitable system of interconnecting passages.

In Figure 6, I illustrate the transversely extending members 50 as provided with individual valve tube passages 54, herein shown as extending outwardly through the side frame member 2.

It will be understood, of course, that in the form of Figures 5 and 6, any suitable type of flexible walled member may be employed, and the form of Figures 3 and 4 are merely illustrative of a practical solution of the problem.

It will be understood that any suitable fluid may be employed, air being satisfactory as a gas, and water as a liquid. However, any suitable fluid or mixture of fluids may be employed, provided, of course, that fluids which tend to damage the particular flexible substance employed are not used.

It will be realized that, whereas I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of the invention are as follows:

In supporting and tensioning a screen element on a screen frame, it is important to prevent sagging or distortion of the screen element and to keep it in a state of tension. It is, of course, possible to subject a screen element mechanically to transverse or longitudinal tension. Where the screen is tensioned over rigid supporting elements, there is always substantial wear.

According to the present invention, the screening element is supported by inflatable and preferably pneumatic members, which assist in keeping the screening element in proper tension and position. Any suitable screen deck may be employed, preferably including a square or rectangular frame, which may be mounted resiliently or vibratably upon any suitable base. It will be undertsood that in the use of the device, any suitable means may be employed for imparting vibration to the deck and thus to the screening element supported on the deck. The deck is provided with a plurality of transversely extending relatively rigid screening supports. These screening supports in turn have associated therewith the individual flexible inflatable supports above described. These flexible supports may, if desired, be secured to the rigid supports, or they may be held normally in fixed relationship thereto by the tension of the screening element itself. The result is a flexible supporting connection between the screening element, which reduces wear and assists in maintaining the screening element in proper position and tension. It will be understood that any suitable means may be employed for clamping the longitudinal edges of the screen element in place.

In the employment of the invention, preferably the screening element is first positioned, as shown for example in Figures 1 and 2, and thereafter the pneumatic tubes of Figures 3 and 4 are inflated, thus providing ready means for subjecting the screen cloth to any desired tension within suitable limits. Tension may be varied by varying the inflation of the pneumatic tubes or flexible screen supports.

The whole area of the screening element is tensioned evenly, with an increase in screening efficiency and the prolongation of the life of the screening element.

I claim:

1. In combination, in a screen, a screen deck having a plurality of transversely extending supports, means for tensioning a screen cloth across said supports, and additional means for tensioning said screen cloth, including flexible walled pneumatic elements, on said supports, in direct contact with the lower side of the screen cloth, and means for inflating said pneumatic elements.

2. In combination, in a screen, a screen deck having a plurality of transversely extending supports, means for tensioning a screen cloth across said supports, and additional means for tensioning said screen cloth, including flexible walled pneumatic elements, on said supports, in direct contact with the lower side of the screen cloth, means for inflating said pneumatic elements, and ducts extending between said elements, adapted to connect them in a single pneumatic system, whereby the pneumatic elements may be simultaneously inflated to a uniform pressure.

3. In combination, in a screen, a screen deck having a plurality of transversely extending supports, means for tensioning a screen cloth across said supports, and additional means for tensioning said screen cloth, including flexible walled pneumatic elements, on said supports, in direct contact with the lower side of the screen cloth, and means for inflating said pneumatic elements, said supports constraining said screen cloth to an upwardly concave contour, taking the screen cloth in vertical section from end to end of the screen.

JOHN P. BURLS.